US011901657B2

(12) United States Patent
Wei

(10) Patent No.: US 11,901,657 B2
(45) Date of Patent: Feb. 13, 2024

(54) CONNECTOR

(71) Applicant: P-TWO INDUSTRIES INC., Taoyuan (TW)

(72) Inventor: Chia-Chen Wei, Taoyuan (TW)

(73) Assignee: P-TWO INDUSTRIES INC., Taoyuan (TW)

( * ) Notice: Subject to any disclaimer, the term of this patent is extended or adjusted under 35 U.S.C. 154(b) by 0 days.

(21) Appl. No.: 17/710,395

(22) Filed: Mar. 31, 2022

(65) Prior Publication Data

US 2022/0352663 A1 Nov. 3, 2022

(30) Foreign Application Priority Data

Apr. 28, 2021 (TW) ................................ 110204819

(51) Int. Cl.

*H01R 12/58* (2011.01)
*H01R 12/72* (2011.01)
*H01R 13/627* (2006.01)
*H01R 13/645* (2006.01)
*H01R 25/00* (2006.01)

(52) U.S. Cl.

CPC ........... *H01R 12/724* (2013.01); *H01R 12/58* (2013.01); *H01R 13/6271* (2013.01); *H01R 13/6456* (2013.01); *H01R 25/006* (2013.01)

(58) Field of Classification Search

CPC .. H01R 12/724; H01R 12/58; H01R 13/6271; H01R 13/6456; H01R 25/006; H01R 12/7052; H01R 12/7088; H01R 13/6272; H01R 13/64; H01R 13/41

See application file for complete search history.

(56) References Cited

U.S. PATENT DOCUMENTS

| | | | | |
|---|---|---|---|---|
| 9,287,671 | B1 * | 3/2016 | Chen | H01R 13/113 |
| 10,581,185 | B2 * | 3/2020 | Sakai | H05K 3/00 |
| 10,879,633 | B2 * | 12/2020 | Fu | H01R 12/57 |
| 2008/0182439 | A1 * | 7/2008 | Schell | H01R 13/11 439/140 |
| 2017/0294725 | A1 * | 10/2017 | Kang | H01R 12/716 |
| 2019/0190197 | A1 * | 6/2019 | Ohsako | H01R 13/436 |
| 2021/0184403 | A1 * | 6/2021 | Little | H01R 12/79 |
| 2022/0085548 | A1 * | 3/2022 | Yi | H01R 12/73 |
| 2022/0328996 | A1 * | 10/2022 | Mastel | H01R 13/44 |

FOREIGN PATENT DOCUMENTS

| | | | |
|---|---|---|---|
| EP | 2525442 | * 11/2012 | H01R 12/724 |

* cited by examiner

*Primary Examiner* — Truc T Nguyen

(74) *Attorney, Agent, or Firm* — Muncy, Geissler, Olds & Lowe, P.C.

(57) ABSTRACT

A connector includes a housing, a first electrode and a second electrode. The housing further includes a first body, bending parts, foolproof key positions, a second buckle, a first opening and a second opening. The first body forms a first accommodating space and a second accommodating space. The first accommodating space is provided with the foolproof key positions, the first opening, the second opening and the second buckle. The second buckle can be arranged corresponding to a first buckle of the wire end connector to buckle the wire end connector in the first accommodating space and the second accommodating space. The first electrode includes a first end and a third end, and the third end forms first current divider pins. The second electrode includes a second end and a fourth end, and the fourth end forms second current divider pins.

9 Claims, 6 Drawing Sheets

CONNECTOR

FIELD OF THE INVENTION

The present invention relates to a technical field of connectors, especially to a type of connector.

BACKGROUND OF THE INVENTION

A traditional connector is composed of a male plug and a female receptacle, and the purpose of electrical connection is achieved by the combination of the male plug and the female receptable.

Generally, the configuration of a male plug and a female receptable includes board-to-board, wire-to-board or wire-to-wire. In some applications such as large current transmission, in order to be able to transmit the large current from the wire end to the printed circuit board at the board end, there needs to be a stable and reliable wire-to-board connector.

In view of this, the present invention proposes a connector to provide high-current wire-to-board current transmission.

SUMMARY OF THE INVENTION

The first objective of the present invention is to provide a connector, which is a board-end connector type for connecting a wire-end connector.

The second objective of the present creation is based on the aforementioned connector, wherein the housing has a first opening and a second opening. In the front view of the housing, the first opening is located above the second opening, and there is a height difference between the first opening and the second opening, so as to avoid improper electrical connection between the first electrode disposed in the first opening and the second electrode of the second opening, such as short-circuit connection.

The third objective of the present invention is to provide foolproof key positions (or called Key positions) on the housing according to the aforementioned connector, for combining with the wire end connector, and the foolproof key positions are formed in the middle part of the first accommodating space of the housing and are adjacent to the second opening, and the distance between the foolproof key positions is smaller than the distance between the inner walls of the first accommodating space.

The fourth objective of the present invention is to form current divider pins at one end of the first electrode and one end of the second electrode respectively according to the aforementioned connector for the purpose of large current division and heat dissipation.

The fifth objective of the present invention is to provide a reinforcing rib according to the aforementioned connector, so as to strengthen the degree of the housing for adapting to the housing having a height.

The sixth objective of the present invention is based on the aforementioned connector, wherein the first electrode and/or the second electrode are formed with openings for subsequent bending.

The seventh objective of the present invention is based on the aforementioned connector, further comprising extension pieces formed on the sides of the housing respectively, where in addition to stably fixing the connector to the printed circuit board, the extension pieces can further increase the strength when the first electrode and the second electrode are respectively inserted into the first opening and the second opening.

In order to achieve the above objectives among others, the present invention provides a connector capable of connecting a printed circuit board having a first solder hole set and a second solder hole set and a wire end connector having a first buckle. The connector includes a housing, a first electrode and a second electrode. The housing further includes a first body, a plurality of bending parts, a plurality of foolproof key positions, a second buckle, a first opening and a second opening. The first body forms a first accommodating space and a second accommodating space. The bending parts are used for distinguishing the first accommodating space and the second accommodating space. The foolproof key positions, the first opening and the second opening are disposed in the first accommodating space. The second buckle is disposed in the second accommodating space. The second buckle may be disposed corresponding to the first buckle of the wire end connector for buckling the wire end connector in the first accommodating space and the second accommodating space. The volume of the first accommodating space is greater than the volume of the second accommodating space. The first electrode includes a first end and a third end. The first end corresponds to the first opening and the third end forms a plurality of first current divider pins for disposing the first solder hole set. Wherein, the number of the first current divider pins is not less than three. The second electrode includes a second end and a fourth end. The second end is disposed corresponding to the second opening. The fourth end forms a plurality of second current divider pins for disposing the second solder hole set. Wherein, the number of the second current divider pins is not less than three.

In order to achieve the above objectives among other objectives, the present invention provides a connector having a housing, a first electrode and a second electrode. The main technical feature of the connector is that the housing includes a first body, two bending parts, two foolproof key positions and a second buckle. The first body forms a first accommodating space and a second accommodating space. Wherein, the volume of the first accommodating space is greater than the volume of the second accommodating space. The bending parts are formed on the exterior of the first body to distinguish the first accommodating space and the second accommodating space. The two foolproof key positions are disposed in the first accommodating space to divide the first accommodating space into two sub-spaces for forming a first opening and a second opening respectively. The two foolproof key positions are formed in the middle part of the first accommodating space and adjacent to the second opening, and there is a third distance between the foolproof key positions. The third distance is smaller than a first distance between the inner walls of the first accommodating space. A second buckle is disposed at the second accommodating space. The second buckle may be disposed corresponding to a first buckle of an external wire end connector for buckling the wire-end connector in the first accommodating space and the second accommodating space.

BRIEF DESCRIPTION OF THE DRAWINGS

FIG. 2(*b*) is a side view illustrating the housing of FIG. 1 of the present invention.

FIG. 2(*c*) is a rear view illustrating the housing of FIG. 1 of the present invention.

DETAILED DESCRIPTION OF THE PREFERRED EMBODIMENTS

In order to fully understand the purpose, features and effects of the present invention, the following specific embodiments are used in conjunction with the accompanying drawings to give a detailed description of the present invention. The description is as follows:

In this specification, "a" or "an" is used to describe the units, elements and components described herein. This is just for the convenience of illustration and provides a general meaning to the scope of the present invention. Therefore, unless clearly stated otherwise, this description should be understood to include one or at least one, and the singular number also includes the plural number.

In this specification, the terms "include", "comprise", "have" or any other similar terms are intended to cover non-exclusive inclusions. For example, an element, structure, product or device that contains a plurality of features is not limited to the requirements listed herein, but may include those features that are not explicitly listed but are generally inherent in the element, structure, product or device. In addition, unless there is a clear statement to the contrary, the term "or" refers to the inclusive "or" rather than the exclusive "or".

Figure 1:
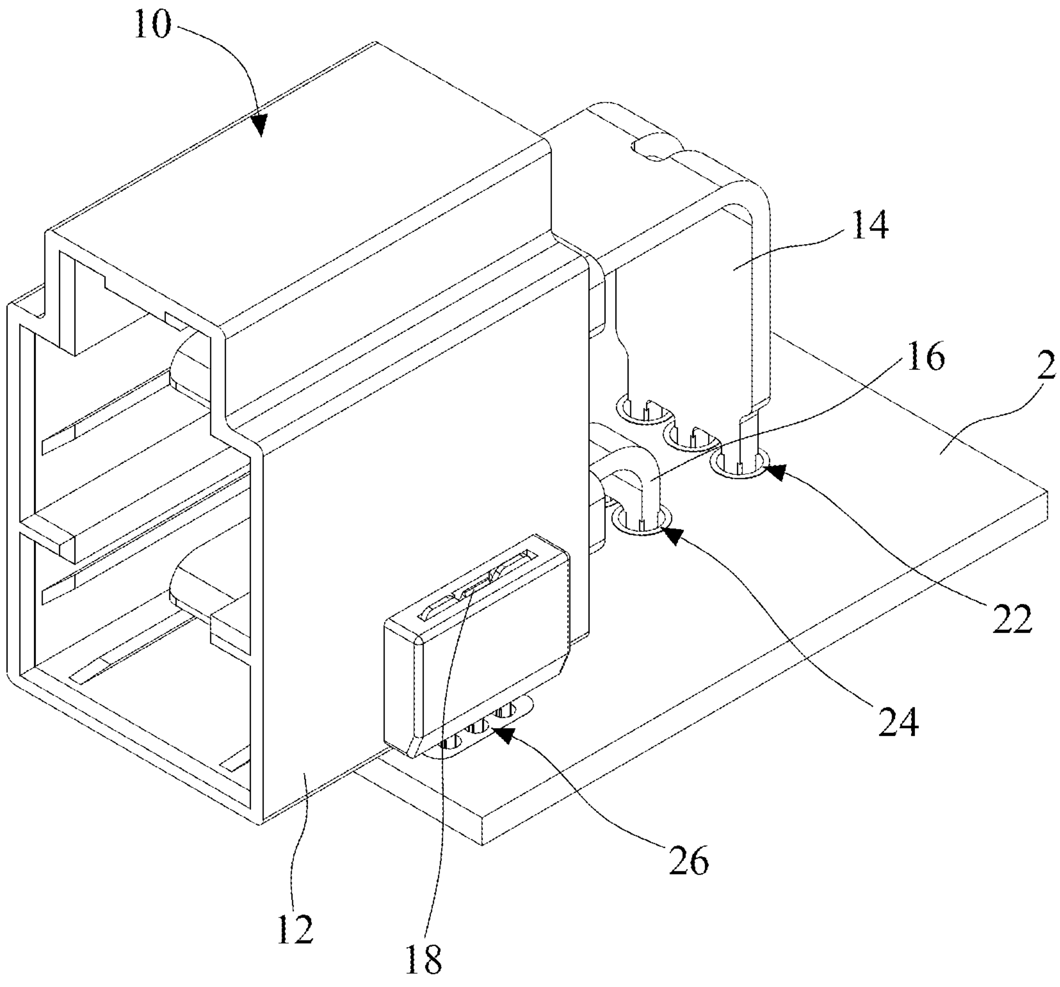
FIG. 1 is a three-dimensional schematic diagram of the connector according to a first embodiment of the present invention.

Please refer to FIG. 1, which is a schematic diagram of the application of the connector according to an embodiment of the present invention. In FIG. 1, the connector 10 is capable of connecting a printed circuit board 2 with a wire end connector (not shown). Wherein, the printed circuit board 2 forms a first solder hole set 22, a second solder hole set 24 and a third solder hole set 26; furthermore, the wire end connector has a first buckle (not shown in the figure), and the wire end connector is a traditional wire end connector, which will not be elaborated here.

The connector 10 includes a housing 12, a first electrode 14 and a second electrode 16.

Figure 2A:
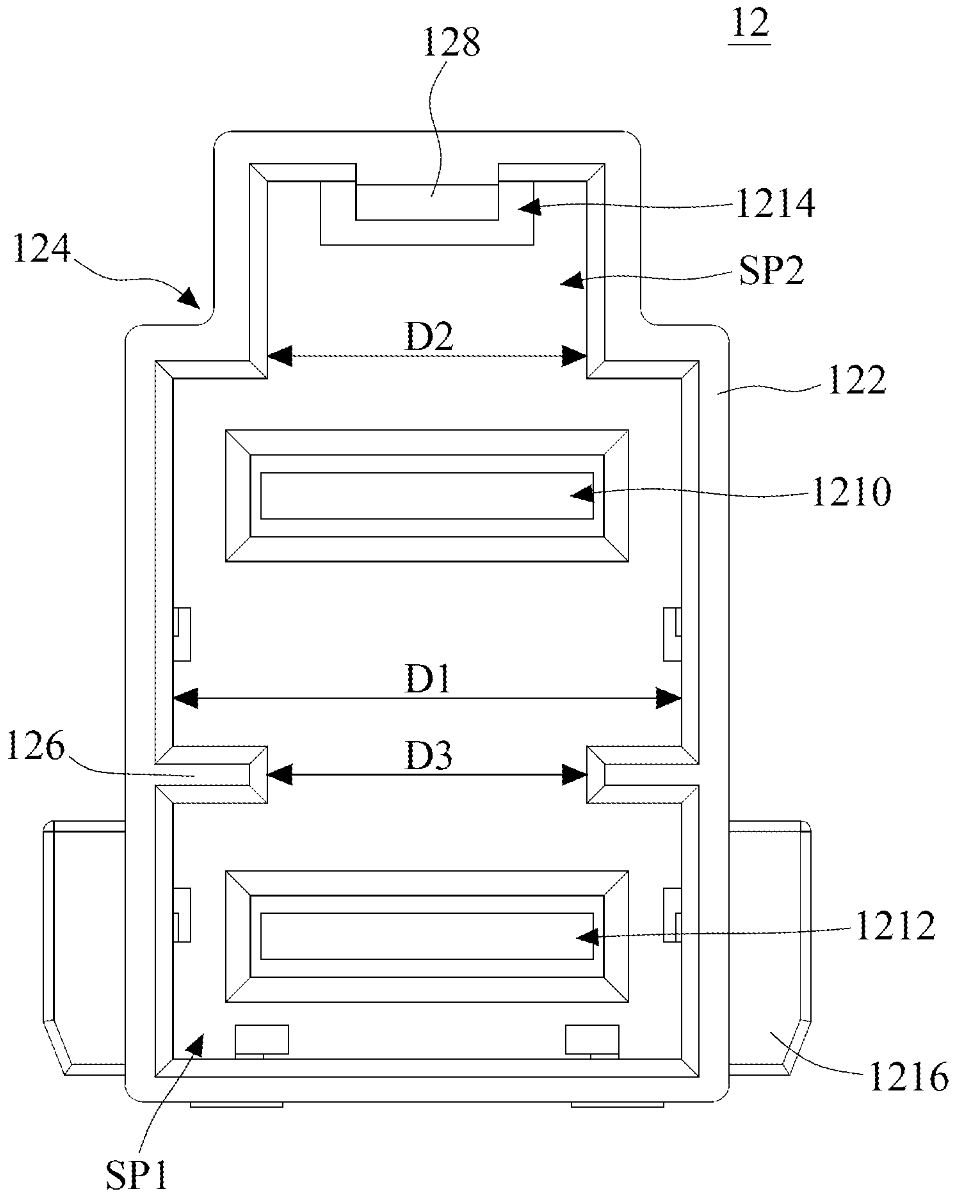
FIG. 2(*a*) is a front view illustrating the housing of FIG. 1 of the present invention.
Figure 2B:
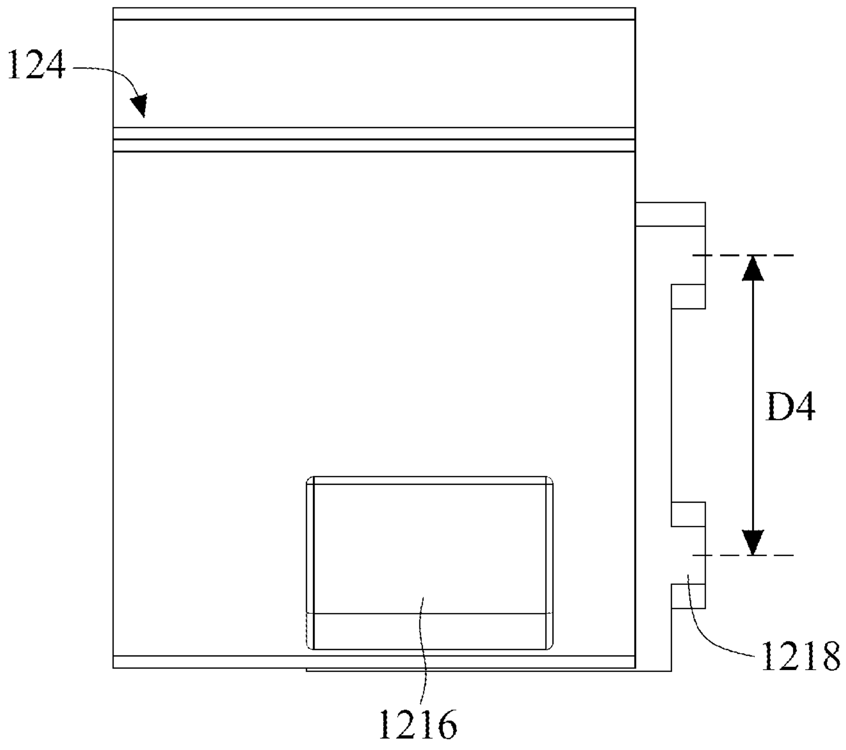
Figure 2C:
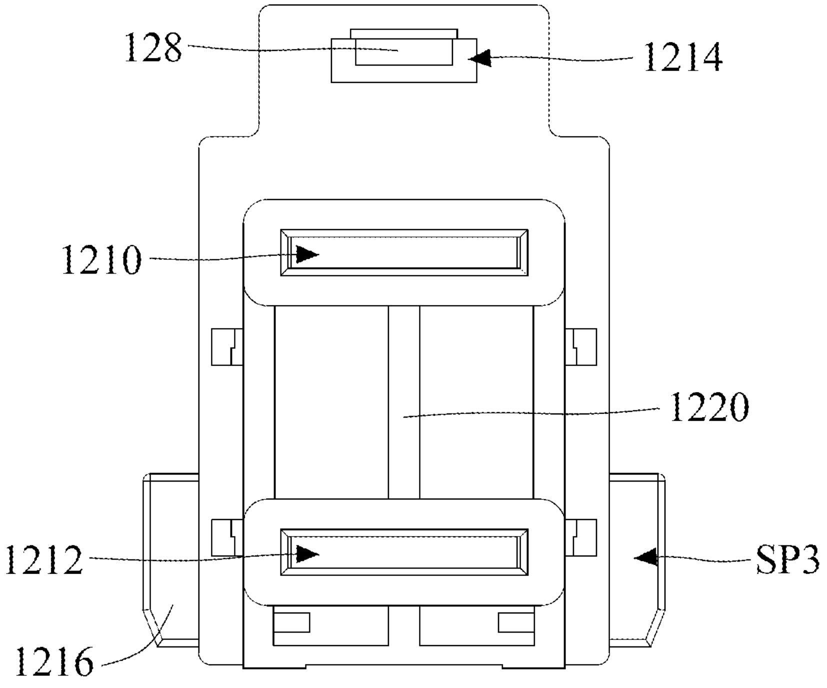

Referring to FIG. 2(*a*) to FIG. 2(*c*) together, detailed schematic diagrams of the housing of FIG. 1 of the present invention. FIG. 2(*a*) is a front view illustrating the housing of FIG. 1 of the present invention; FIG. 2(*b*) is a side view illustrating the housing of FIG. 1 of the present invention; and FIG. 2(*c*) is a rear view illustrating the housing of FIG. 1 of the present invention.

The housing 10 further includes a first body 122, a bending part 124, a foolproof key position 126, a second buckle 128, a first opening 1210 and a second opening 1212.

The first body 122 forms a first accommodating space SP1 and a second accommodating space SP2. The bending parts 124 are formed on two sides of the first body 122 for distinguishing the first accommodating space SP1 and the second accommodating space SP2. The first accommodating space SP1 is configured with a foolproof key position 126, a first opening 1210 and a second opening 1212. The second accommodating space SP2 is configured with a second buckle 128 so as to be able to correspond to the first buckle of the wire end connector, thereby buckling the wire end connector in the first accommodating space SP1 and the second accommodating space SP2. Herein, the volume of the first accommodating space SP1 is greater than the volume of the second accommodating space SP2. Herein, the number of the foolproof key positions 126 is two, and the foolproof key positions 126 form a middle part adjacent to the first accommodating space SP1, and in FIG. 2(*a*), the middle part refers to the lower side portion located at one half mark of the first accommodating space SP1. Herein, there is a third distance D3 between the foolproof key positions 126, and the third distance D3 is smaller than the first distance D1 between the inner walls of the first accommodating space SP1, and the third distance D3 is smaller than or equal to the second distance D2 between the inner walls of the second space SP2. The foolproof key positions 126 divide the first accommodating space SP1 into two sub-spaces for forming the first opening 1210 and the second opening 1212 respectively.

In FIG. 2(*b*), the first opening 1210 and the second opening 1212 have a height difference of a fourth distance D4. In addition, herein, the first body 122 further includes a second extension 1218 formed on the same side of the first opening 1210 and the second opening 1212 of the first body 122, and the first opening 1210 and the second opening 1212 extend from the first accommodating space SP1 through the second extension part 1218. Wherein, the second extension part 1218 is disposed protruding from the first body 122.

In another embodiment, the connector 10 further includes a reinforcing rib 1220 formed on the surface of the second extension part 1218 to strengthen the structure of the first body 122.

In another embodiment, the housing further includes a third opening 1214 formed on the surface of the first body 122 for dissipating heat and reducing the air resistance generated in the first accommodating space SP1 and the second accommodating space SP2 when connecting the wire end connector.

Figure 4:
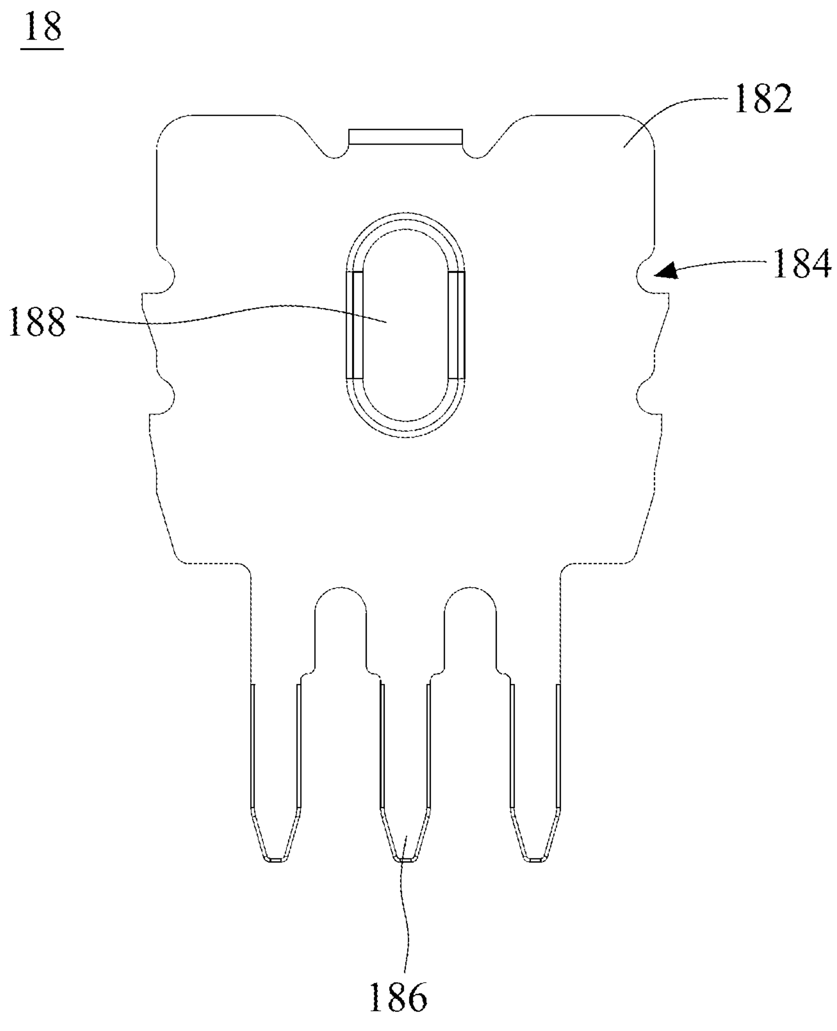
FIG. 4 is a detailed schematic diagram illustrating the fixing piece of FIG. 1 of the present invention.
Figure 5:
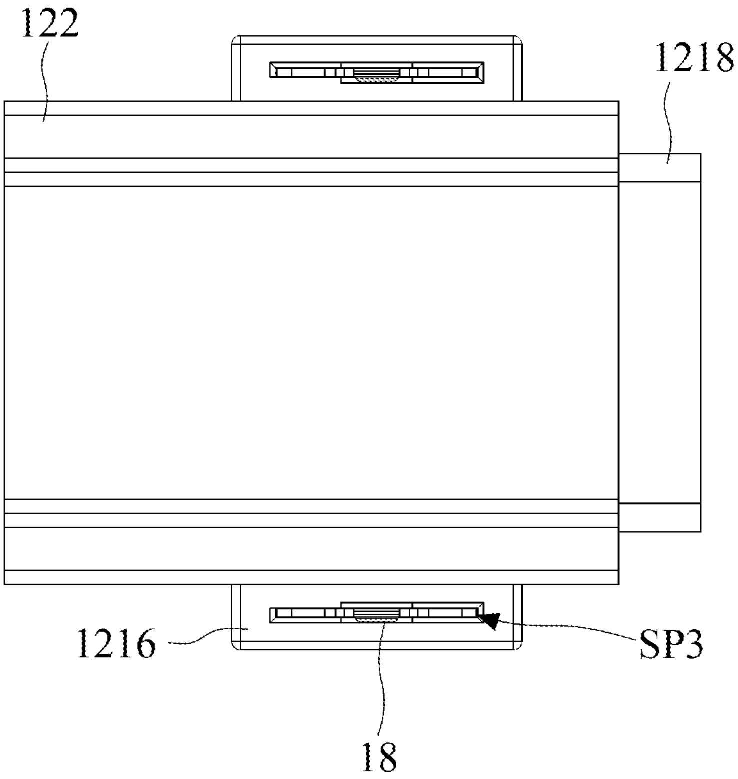
FIG. 5 is a top view illustrating the combination of the fixing piece and the first extension part of FIG. 4 of the present invention.

In another embodiment, the connector 10 further includes a first extension part 1216 and a fixing piece 18. Herein, the number of the fixing piece 18 and the first extension part 1216 is illustrated as two, for example. The first extending parts 1216 are respectively formed on two sides of the first body 122 and form a third accommodating space SP3. The fixing pieces 18 are disposed in the third accommodating space SP3 of each of the extending parts 1216, and one end of each of the first extending parts 1216 can be disposed on the printed circuit board 2. Referring also to FIG. 4 together, a detailed schematic diagram illustrating the fixing member of FIG. 1 of the present invention. In FIG. 4, the fixing piece 18 further includes a fourth body 182, a fifth buckle 184, a third pin end 186 and a third bump 188. The fourth body 182 is a sheet structure. The third pin end 186 is formed at a free end of the fourth body 182. The third bump 188 and the fifth buckle 184 are formed on the fourth body 182 and are disposed corresponding to the third solder hole set 26 of the printed circuit board 2. Referring also to FIG. 5, a top view illustrating the combination of the fixing piece and the first extension part of FIG. 4 of the present invention.

Figure 3:
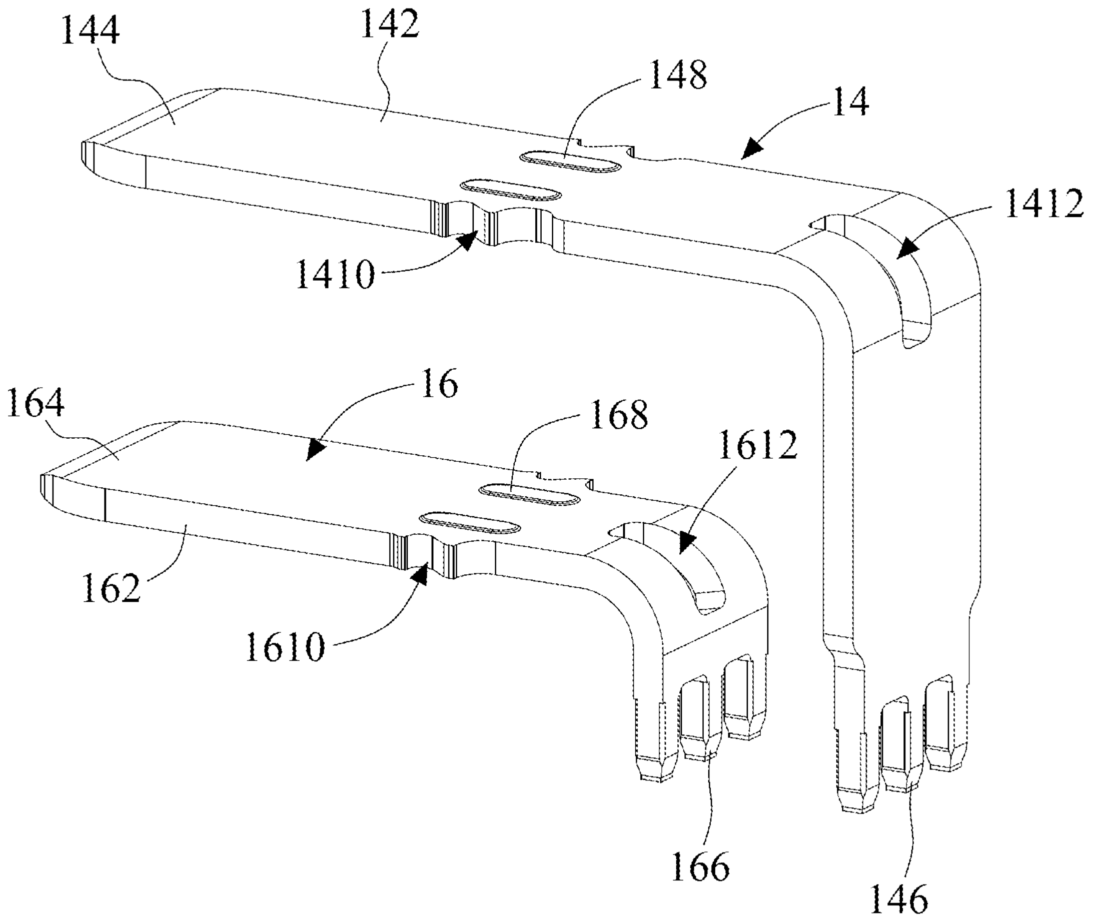
FIG. 3 is a detailed structural diagram illustrating the first electrode and the second electrode of FIG. 1 of the present invention.

Referring also to FIG. 3, a detailed structural diagram of the first electrode and the second electrode of FIG. 1 of the present invention. In FIG. 3, the first electrode 14 and the second electrode 16 are illustrated by taking the L-shaped structure as an example. In other embodiments, the first electrode 14 and the second electrode 16 may have other shapes, as long as the first electrode 14 and the second electrode 16 are not electrically connected to each other when disposed.

The first electrode 14 includes a first end and a third end. The first end is disposed corresponding to the first opening 1210 and the third end forms a plurality of first current divider pins 146 for disposing a first solder hole set 22. Wherein, the number of the first current divider pins 146 is equal to or more than three, which are used for shunting current for the large current application field. Herein, the first electrode 14 further includes a second body 142, a first connection end 144, a first pin end 146, a first bump 148 and a third buckle 1410. The first connection end 144 and the first pin end 146 are respectively formed on the two free ends of the second body 142, and the first connection end 144 may correspond to the first end and the first pin end 146 may correspond to the third end. The first bump 148 and the third buckle 1410 are formed on the second body 142 and disposed corresponding to the first opening 1210, and the first electrode 14 further selectively includes a fourth opening 1412 to form a turning section between the first connection end 144 and the first pin end 146, and the first electrode 14 can be easily bent by means of the fourth opening 1412.

The second electrode 16 includes a second end and a fourth end. The second end is disposed corresponding to the second opening 1212. A plurality of second current divider pins 166 are formed on the fourth end for configuring the second solder hole set 24. Wherein, the number of the second current divider pins 166 is equal to or more than three. Herein, the second electrode 16 further includes a third body 162, a second connection end 164, a second pin end 166, a second bump 168 and a fourth buckle 1610. The second connection end 164 and the second pin end 166 are respectively formed on the two free ends of the third body 162, the second connection end 164 may correspond to the second end and the second pin end 166 may correspond to the fourth end. The second bump 168 and the fourth buckle 1610 are formed on the third body 162 and disposed corresponding to the second opening 1212, and the second electrode 16 further selectively includes a fifth opening 1612. The fifth opening 1612 is formed at the turning section between the second connecting end 164 and the second pin end 166, and the second electrode 16 can be easily bent by means of the fifth opening 1612.

The present invention has been disclosed in preferred embodiments above, but those skilled in the art should understand that this embodiment is only used to describe the present invention and should not be construed as limiting the scope of the present invention. It should be noted that all changes and substitutions equivalent to this embodiment should be included in the scope of the present invention. Therefore, the protection scope of the present invention shall be defined by the scope of the patent application.

What is claimed is:

1. A connector for connecting a printed circuit board having a first solder hole set and a second solder hole set, the connector comprising:

a housing, having a first body, a plurality of bending parts, two foolproof key positions, a second buckle, a first opening and a second opening, wherein the first body forms a first accommodating space and a second accommodating space, the bending parts are used for distinguishing the first accommodating space and the second accommodating space, the first accommodating space is provided with the two foolproof key positions, the first opening and the second opening, and the second accommodating space is provided with the second buckle, a volume of the first accommodating space being greater than a volume of the second accommodating space, and the two foolproof key positions are formed in a middle part of the first accommodating space, wherein there is a third distance between the two foolproof key positions, the third distance is smaller than a first distance between inner walls of the first accommodating space, and the third distance is not greater than a second distance between inner walls of the second accommodating space, the two foolproof key positions divide the first accommodating space into two sub-spaces for forming the first opening and the second opening respectively, wherein there is a fourth difference as a height distance between the first opening and the second opening;

a first electrode, having a first end and a third end, the first end being disposed corresponding to the first opening, and the third end forming a plurality of first current divider pins for disposing the first solder hole set, wherein a number of the first current divider pins is not less than three; and a second electrode, having a second end and a fourth end, the second end being disposed corresponding to the second opening, and the fourth end forming a plurality of second current divider pins for disposing the second solder hole set, wherein a number of the second current divider pins is not less than three.

2. The connector defined in claim 1, further including a plurality of first extension parts and a plurality of fixing pieces, the first extension parts being respectively formed on two sides of the first body and forming a third accommodating space, the fixing pieces being disposed in the third accommodating space of each of the first extension parts, and one end of each of the first extending parts being disposed on the printed circuit board.

3. The connector defined claim 2, wherein each of the fixing pieces further includes a fourth body, a fifth buckle, a third pin end and a bump, and the fourth body has a sheet structure, the third pin end is formed on a free end of the fourth body, and the bump and the fifth buckle are formed on the fourth body and are disposed corresponding to a third solder hole set of the printed circuit board.

4. The connector defined in claim 1, further comprising a second extension part formed on the same side of the first opening and the second opening of the first body, and the first opening and the second opening extend from the first accommodating space and pass through the second extension part.

5. The connector defined in claim 4, further including a reinforcing rib formed on a surface of the second extension part.

6. The connector defined in claim 1, wherein the housing further includes a third opening formed on a surface of the first body.

7. The connector defined in claim 1, wherein the first electrode further includes a second body, a first connection end, a first pin end, a first bump, and a third buckle, the second body being an L-shaped structure, the first connection end and the first pin end being respectively formed on two free ends of the second body, the first bump and the third buckle being formed on the second body and disposed corresponding to the first opening, and the first electrode further selectively including a fourth opening, the fourth opening being formed at a turning section between the first connection end and the first pin end, wherein the first connection end corresponds to the first end and the first pin end corresponds to the third end.

8. The connector defined in claim 1, wherein the second electrode further includes a third body, a second connection end, a second pin end, a second bump and a fourth buckle, the third body is an L-shaped structure, and the second connection end and the second pin end are respectively formed on two free ends of the third body, the second bump and the fourth buckle are formed on the third body and corresponding to the second opening, and the second electrode optionally includes a fifth opening, the fifth opening is formed at a turning point between the second connection end and the second pin end, wherein the second connection end corresponds to the second end and the second pin end corresponds to the fourth end.

9. A connector comprising a housing, a first electrode and a second electrode, wherein the housing comprises:

a first body forming a first accommodating space and a second accommodating space, wherein a volume of the first accommodating space is larger than a volume of the second accommodating space;

two bending parts formed on an exterior of the first body for distinguishing the first accommodating space and the second accommodating space;

two foolproof key positions disposed in the first accommodating space to divide the first accommodating space into two sub-spaces for forming a first opening and a second opening respectively, the foolproof key positions being formed in a middle part of the first accommodating space adjacent to the second opening, a distance between the foolproof key positions being smaller than a distance between inner walls of the first accommodating space; and a second buckle disposed at the second accommodating space, the second buckle being disposed corresponding to a first buckle of an external wire end connector, and used for buckling the wire end connector in the first accommodating space and the second accommodating space.

* * * * *